United States Patent Office 3,600,328
Patented Aug. 17, 1971

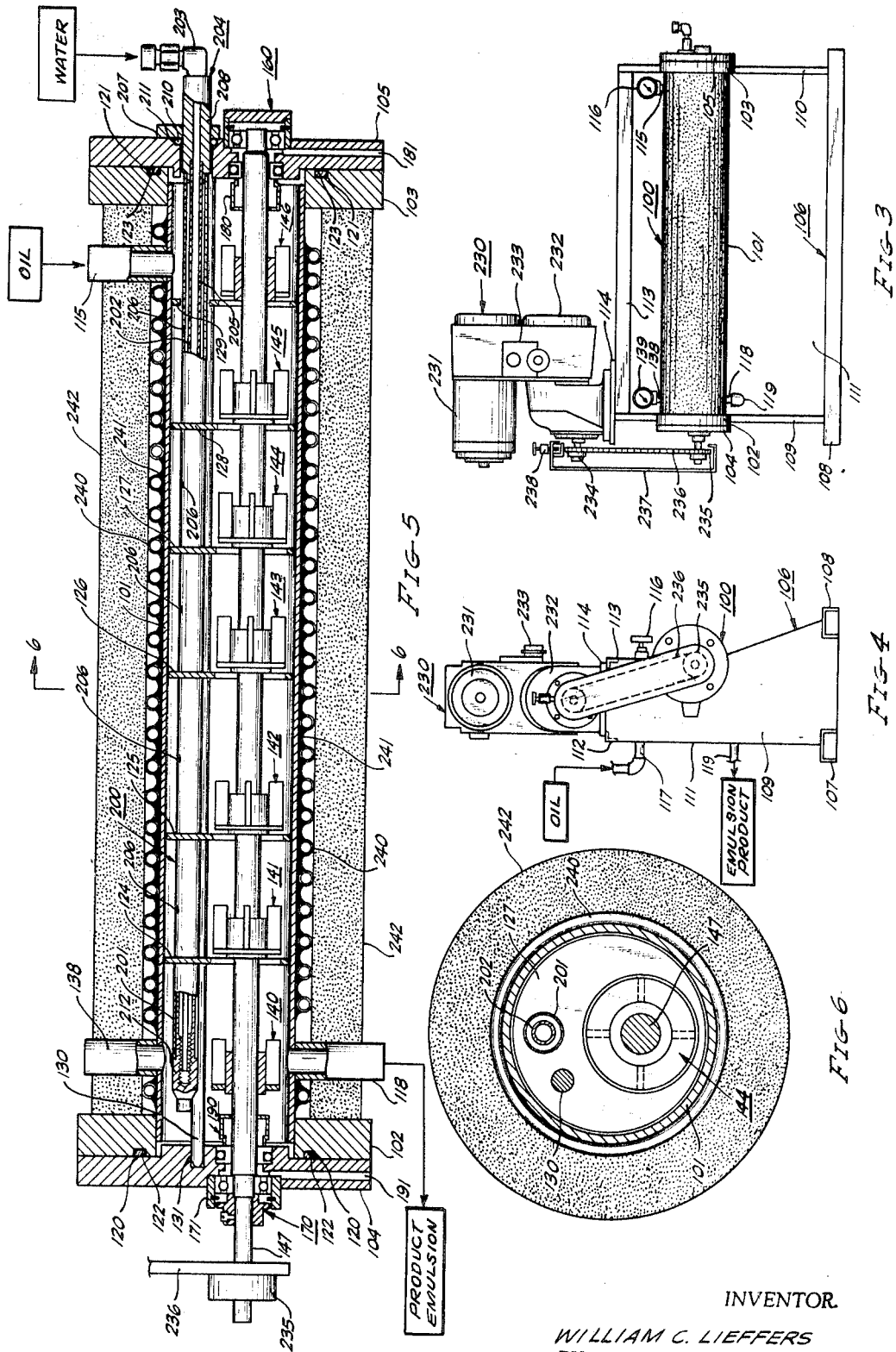

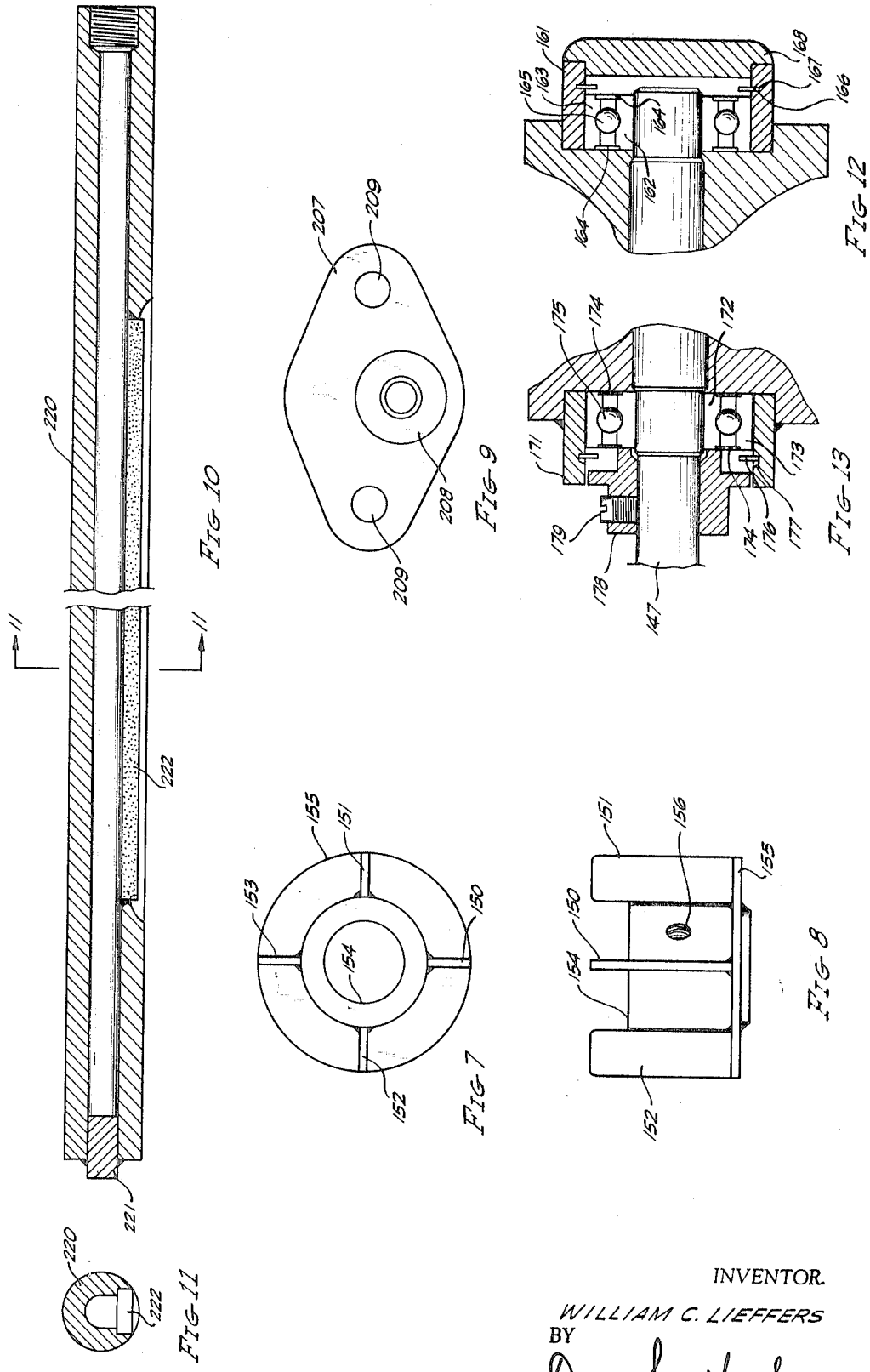

3,600,328
APPARATUS FOR FORMING EMULSIONS
William C. Lieffers, Fullerton, Calif., assignor to Union Oil Company of California, Los Angeles, Calif.
Original application Mar. 14, 1966, Ser. No. 533,992. Divided and this application Dec. 10, 1968, Ser. No. 785,855
Int. Cl. B01d; B01f; B01i 13/00
U.S. Cl. 252—359C
12 Claims

ABSTRACT OF THE DISCLOSURE

An apparatus for continuously producing an emulsion of immiscible liquids consisting of an elongated shell defining a mixing chamber through which a first liquid chamber along a substantial length of the chamber and means for introducing a second liquid into the mixing chamber along a substantial length of the chamber whereby an emulsion of second liquid in first liquid is formed and then inverted to an emulsion of first liquid in second liquid.

---

This is a division of application Ser. No. 533,992, filed Mar. 14, 1966, which application is now abandoned.

This invention relates generally to the formation of emulsions, and more particularly, to an apparatus for continuously forming an emulsion of two immiscible liquids. More specifically, the invention is directed to an apparatus for continuously forming a liquid-wax-in-water emulsion. In another aspect, the invention is directed to an apparatus for the continuous production of a solid-in-liquid suspension by first continuously forming an emulsion of a molten substance in an immiscible liquid, and then reducing the temperature of the emulsion to solidify the dispersed molten phase.

Emulsions of various immiscible liquids have gained wide usage in such diverse applications as cosmetics, pharmaceuticals, polishes, paints, agricultural sprays, well drilling fluids, food products, road building materials, textile treating, rubber products, and in the manufacture of paper and particle board. Emulsions are desired both for the properties of the emulsion itself and because oftentimes a substance is rendered more readily usable by emulsification. Generally, emulsion formation is achieved by the techniques of simple mixing with propeller or turbine mixers, homogenization, or colloid milling. With the increased demand for volume quantities of emulsions, equipment has been developed for the continuous production of various emulsions in large quantities. Although the simple mixing techniques are preferred from the standpoint of low power input and simplicity of equipment, emulsions formed in this manner are usually of inferior quality. Thus, despite the high power requirements and the complicated, close tolerance mechanical equipment required for homogenization and colloid milling, most high volume industrial emulsification equipment is of these types.

A homogenizer is a device in which dispersion is effected by forcing the mixture to be emulsified through a small orifice under very high pressure, typically within the range of 1000 and 5000 p.s.i. In the standard colloid mill, emulsification is accomplished by means of a shearing action imparted to the liquid by a rotor, revolving at speeds of from 1000 to 20,000 r.p.m., and a stator. The emulsion passes between these two opposing faces through a clearance which may be as small as 0.001 inch. The faces of the rotor and stator can be completely smooth, or can be roughened by a series of concentric or radial corrugations. Also, various ultrasonic emulsators have been proposed which employ piezoelectric or magnetostrictive principles. However, there are problems involved in adapting the ultrasonic devices to large volume operations, and they have not been widely employed commercially. One common aspect of each of the above apparatuses is that the immiscible liquids to be emulsified, and the emulsifier, are combined in their final proportions and subjected to mixing action.

An emulsion is defined as a heterogeneous system consisting of at least one immiscible liquid intimately dispersed in another in the form of droplets whose diameters in general, exceed 0.1 micron. Emulsions are broadly classified as either oil in water or water in oil emulsions depending on which component is the continuous and which component is the disperse phase. An oil in water emulsion consists of finely divided droplets of oil suspended in a matrix of water, and conversely, a water in oil emulsion consists of droplets of water in a continuous oil phase. This terminology is often applied to emulsions in which the phases are not, strictly speaking, oil and/or water. The preparation of stable emulsions must be controlled carefully since emulsions are sensitive to such variations as the mode of agitation, the nature and amount of the emulsifying agent, and temperature changes.

Desirable properties of an emulsion depend largely on the specific use of the emulsion, but can be categorized generally as stability, liability, homogeniety and viscosity or consistency. Stability is concerned with the life of the emulsion under conditions of quiescent storage, and also its resistance to outside influences, such as extreme heat or cold, which possibility brings about premature coagulation. Emulsions are often required to stay in good condition for six months or more, and only the most perfunctory agitation can be relied upon to redistribute any sediment of disperse phase which may have formed. The lability of an emulsion is its tendency to break down under conditions of use, which is of primary consideration in many emulsion applications, such as for example in emulsion paints and asphaltic bitumen emulsions. The requirements regarding homogeneity are, in the main, that the particles of disperse phase larger than microscopic sizes shall be nonexistent, or of strictly limited amount, so that the emulsion can be passed through spraying jets and other small orifices. Further, the general microscopic dispersion should be fine enough to ensure no gradual coarsening of the dispersion which would result in time in partial coagulation. The viscosity of the emulsion is of considerable importance in regard to pumpability of the emulsion, and also in many applications in determining covering power and rate of spraying under given conditions. In the usual case the viscosity varies with both the volume concentration of disperse phase and the viscosity of the external phase.

The properties of an emulsion depend primarily on its composition, the nature and amount of the emulsifying agent, the mode of agitation, and upon temperature changes to which the emulsion may have been subjected. Heretofore, the preparation of emulsions in commercial quantities has required both expensive and complicated emulsification equipment, large power inputs, and relatively high concentrations of expensive emulsifying and stabilizing ingredients.

Emulsification is also an important step in the formation of dispersions of finely divided solid particles in liquid as many such dispersions are prepared by first forming an emulsion of the molten disperse phase and then cooling the mixture to solidify or freeze the disperse phase. A particular example of solid in liquid dispersions prepared by this technique are dispersions of finely divided solid wax in water, such as are used in the manufacture of particle board. In this application, the wax dispersion and a resin are sprayed on the wood chips prior to curing the mass to obtain the particle board product. In this instance wax is applied in dispersion form primarily for ease of handling and to obtain the required degree of distribution. Prior art methods of preparing the wax in water dispersions at the mill site have been either expensive or largely unsatisfactory. Shipment of the wax dispersion from the refinery or other dispersion manufacturing plant entails the unnecessary shipment of large quantities of water and further requires dispersion storage at the mill site, all of which further add to the production cost.

Accordingly, it is an object of the present invention to provide apparatus for the production of emulsions of immiscible liquids. Another object is to provide apparatus for the continuous production of emulsions possessing improved properties. Another object is to provide apparatus for producing improved oil in water emulsions. Still another object is to provide apparatus for forming stable wax in water emulsions. Still another object is to provide apparatus for producing dispersions of finely divided solids in liquid. A still further object is to provide simplified apparatus for continuously producing dispersions of finely divided wax in water. Other objects and advantages of the invention will be apparent to those skilled in the art from the description thereof which follows.

An emulsion of an enclosed liquid in an immiscible external liquid phase can be formed by incrementally adding the liquid ultimately forming the external phase to a body of the liquid which will utimately comprise the enclosed phase under conditions of agitation sufficient to form an initial emulsion of the added liquid in the liquid body. Liquid addition and agitation is continued until sufficient liquid has been added to cause the emulsion to invert so as to form the desired emulsion of enclosed liquid in an immiscible external liquid phase. Additional external liquid phase can be added under conditions of agitation to obtain the desired emulsion composition and properties. Where the enclosed liquid has a freezing point above that of the external liquid, a solid in liquid suspension can be formed by cooling the emulsion to a temperature below the freezing point of the enclosed phase so as to solidify this phase.

The foregoing emulsification method is particularly adapted to the continuous production of an emulsion of immiscible liquids by a process in which both the production rate and the properties of the emulsion can be controlled. One continuous mode of performing the process is illustrated in FIG. 1 which is a simplified flow diagram schematically illustrating the process steps. In the illustrated embodiment, the emulsion is formed by passing the liquid which will ultimately comprise the dispersed enclosed phase through a series of mixing chambers, or zones, 1, 2, 3 and 4 provided with mixing means 5, 6, 7 and 8, respectively, and incrementally adding the liquid which will ultimately form the external continuous phase thereto so that a portion of this liquid is added in each of the mixing chambers. In this manner a concentration gradient of ultimate dispersed phase relative to the ultimate continuous phase is established in the successive mixing chambers.

In the method of FIG. 1, a first liquid which will ultimately form the enclosed phase is continuously passed to chamber 1 through line 9 at a rate controlled by valve 21. A second liquid immiscible with the first liquid and which will ultimately form the external phase of the emulsion is continuously added through line 10 to the body of liquid in chamber 1 at a rate controlled by valve 17. The second liquid is intimately mixed with the reservoir or body of first liquid in chamber 1 to form an emulsion of the second liquid dispersed in the first liquid. This emulsion is continuously passed from chamber 1 to chamber 2 via conduit 11. An additional quantity of the second liquid is introduced into chamber 2 through line 12 at a rate controlled by valve 18 and becomes admixed with the liquid content of the chamber. In like manner, the liquid passes continuously from chamber 2 to chamber 3 through conduit 13 and then to chamber 4 via conduit 15, with additional quantities of the second liquid being added to each of the chambers 3 and 4 via lines 14 and 16, respectively, at rates controlled by valves 19 and 20. Where the first liquid is comprised of a mixture of liquid ingredients, it can be advantageous to defer addition of the second liquid to chamber 2, thus using chamber 1 only as a mixing chamber to assure homogeneity of the first liquid.

Mixing of the immiscible liquids so as to form finely dispersed droplets of the second liquid in the first liquid is accomplished both by agitation in the mixing chambers and secondarily, to a lesser degree, by passage of the mixed liquid phases through the flow conduits interconnecting the mixing chambers. At some point in the flow of fluid through the various serially arranged mixing zones, the exact point depending on the properties of the ingredients and the mixing conditions, sufficient of the second liquid will be added and sufficient mixing accomplished to invert the initial emulsion of second liquid to an emulsion wherein the first liquid becomes the discontinuous or enclosed phase and the second liquid becomes the external continuous phase. This emulsion is withdrawn from chamber 4 via line 22. Although the process illustrated in FIG. 1 is conducted in four serially arranged mixing chambers, it is apparent that any number of such mixing stages can be employed so long as inversion of the initial emulsion to the product emulsion is achieved.

In the case where it is desired to solidify the dispersed liquid, the emulsion withdrawn from the final chamber, chamber 4 in the illustrated case, is passed through a cooling step to cool the emulsion mixture to a temperature below the freezing point of the dispersed phase. The technique of cooling is often critical as shock cooling can adversely affect the quality of the emulsion. Thus, it can be advantageous to slowly cool the emulsion to effect solidification of the dispersed phase. This technique is illustrated in the process of FIG. 1 wherein the emulsion withdrawn from chamber 4 is passed through cooler 23 by closing valve 24 and opening valve 25. Emulsion then flows through line 26 and cooler 23. Cooler 23, in the illustrated example, comprises a double pipe or jacketed exchanger adapted to interchange heat from the hot emulsion to a cooling fluid, entering at 27 and exiting at 28, in countercurrent relationship. The hot emulsion is slowly cooled in passing through exchanger 23 and the disperse phase is solidified. The resulting finely divided solid in liquid dispersion is withdrawn as product.

It is often advantageous, particularly in the case where the ultimate product is a dispersion, to heat either one or both of the liquids passed to the first mixing chamber. Additionally, one or more of the mixing chambers can be heated to maintain the disperse liquid in the molten state until the resulting emulsion is withdrawn from the final mixing chamber. However, this heating must be carefully controlled since, in the usual case, excessive heating can destroy the emulsion.

Although a plurality of separate mixing chambers are illustrated in FIG. 1, the process can also be carried out using other types of mixing arrangements. One alternative mode of operation is illustrated in FIG. 2 which is a simplified flow diagram schematically illustrating an embodiment of the process wherein mixing is accomplished in an elongated mixing zone. In the embodiment illustrated in FIG. 2, the emulsion is formed by passing the liquid which will ultimately comprise the dispersed enclosed phase through an elongated mixing zone 51 provided with means for mixing the liquid contents passing therethrough. Mixing is accomplished by a plurality of propellers spaced along the mixing zone, such as illustrated at 52, 53, 54 and 55, which are mounted on shaft 56 rotatably driven by motor 57. Shaft 56 extends substantially the length of mixing zone 51 to permit the spacing of the mixing propellers at intervals along the length of the mixing zone.

In the method illustrated in FIG. 2, a first liquid which will ultimately form the enclosed phase of the emulsion is continuously passed to mixing zone 51 through line 58 at a rate controlled by valve 59. A second liquid immiscible with the first liquid and which will ultimately form the external phase of the emulsion is continuously introduced at a plurality of points along the length of the mixing zone, such as through lines 61, 62, 63 and 64 at rates controlled by valves 65, 66, 67 and 68, respectively, to achieve a concentration gradient of first liquid relative to second liquid along the length of zone 51. It is sometimes advantageous to introduce the added second liquid into the suction eye of the mixing propellers. As in the embodiment of the process illustrated in FIG. 1, an initial emulsion of the ultimate continuous phase in the ultimate disperse phase is formed on admixture of the two immiscible liquids. At some point along the length of the mixing zone, depending on the relative proportions of the two liquids and the degree of agitation, the initial emulsion of second liquid in first liquid will invert to an emulsion wherein the first liquid becomes the discontinuous or enclosed phase and the second liquid becomes the external continuous phase. Superior results can in some cases be attained by providing one or more transverse baffles, not shown, at intervals along the length of the aforesaid chamber to reduce backmixing and permit establishment of a concentration gradient. In the embodiment illustrated in FIG. 2, product emulsion is withdrawn from mixing zone 51 through line 69 which communicates with the mixing zone at the end opposite the point of feed introduction. The product emulsion can be passed through cooling means, such as illustrated in FIG. 1, where it is desired to cool the emulsion to solidify the dispersed phase, or for other purposes.

Although liquid addition is illustrated at intervals along the length of mixing zone 51, and at single points in each of mixing chambers 1, 2, 3 and 4, it is frequently advantageous to introduce the added liquid substantially uniformly along the length of the mixing zones, thereby tending to establish a more uniform concentration gradient. Uniform introduction can be achieved by means of a spray or distribution pipe extending substantially the length of the mixing zone.

Additionally, where individual mixing chambers are employed, such as illustrated in FIG. 1, or where a single baffled mixing chamber is employed, it can be advantageous to size the respective chambers, or to adjust baffle spacing so that the residence time in each mixing zone is constant. Thus, each mixing zone is enlarged sufficiently to accommodate the additional volumes of liquid added to the liquid mixture passing through the mixing zone. Since the properties of the product emulsion are dependent upon the degree of agitation, paddle speed can be adjusted as required. Generally, paddle speed is varied from about 200 to about 1200 r.p.m., with the higher speeds being required at higher throughputs, corresponding to reduced residence time, and with more difficult emulsions. Usually an optimum speed exists for each operation which represents a balance between power consumption and emulsion quality.

This method is particularly suited to the preparation of oil in water type emulsions, and especially emulsions and dispersions of wax in water. These emulsions can be prepared according to the method illustrated in FIG. 1 by passing oil containing admixed emulsifying agent through line 9 and into chamber 1 whereupon the oil is mixed with water entering through line 10 to form a water in oil emulsion. The initial water in oil emulsion formed in chamber 1 passes successively through chambers 2, 3 and 4 in the aforedescribed manner. Additional quantities of water are added in each of these chambers through lines 12, 14 and 16, respectively, so that the initial water in oil emulsion is inverted to an emulsion of the oil in water type. Product emulsion is withdrawn from the final chamber 4 via line 22.

Where the oil fed to chamber 1 is a molten wax which solidifies on cooling, a dispersion of finely divided solid wax can be prepared by passing the emulsion withdrawn from chamber 4 through cooler 23 to reduce the temperature of the emulsion below the freezing point of the wax. The hot wax emulsion is cooled by countercurrent heat exchange and the cooling water temperature regulated so that the maximum temperature difference between the emulsion and the cooling water does not exceed about 30° F. at any point in the exchanger to prevent shock chilling of the wax. Wax dispersions can also be efficaciously prepared according to the mode of operation illustrated in FIG. 2.

Waxes which can be dispersed in water by this method include crystalline and microcrystalline petroleum waxes, as well as beeswax, carnauba wax, condellila wax, montan wax, and the like. Preferred for many applications are dispersions of paraffinic petroleum waxes comprising primarily straight chain hydrocarbons containing eighteen or more carbon atoms, many of which have melting points between about 120° F. and about 165° F. These waxes can be either fully or partially refined. A particularly preferred wax comprises fully refined petroleum paraffin crystalline wax having a melting point between about 130° F. and about 134° F. Another preferred wax found particularly useful in aqueous dispersion for applications such as particle board manufacture is a semi-refined scale wax melting within the range of between about 126° F. to about 130° F.

The emulsification of two immiscible liquids is usually enhanced by the presence of an emulsifying agent which can be either a naturally occurring constituent of one or both of the liquid ingredients, or which can be added specifically to promote emulsification. Accordingly, emulsifier can be added to either one or both of the liquids prior to their introduction into the mixing zone. Emulsification of most immiscible liquids can usually be accomplished by the addition of minor quantities of emulsifier, usually between and 1 and about 10 percent by weight of the total emulsion being sufficient to form stable emulsions, although in some applications as high at 15 percent emulsifier may be required. Any of the conventional emulsifying agents can be employed in the practice of this invention, the choice depending primarily on the materials to be emulsified, the emulsion properties desired, and the ultimate use for the emulsion. Typical of the emulsifiers conventionally employed are surface-active materials of either synthetic or natural origin and of either anionic, cationic, nonionic, or amphelytic characteristic, and finely divided insoluble solids such as basic salts of the metals, carbon black, powdered silica and various clays, such as bentonite.

While, under appropriate conditions, virtually any surface-active agent will suffice to stabilize an emulsion, because of cost, availability and efficiency, only a limited number of the total possible surface-active materials find usage as emulsifying agents. Considerable work has been devoted to developing the theory of emulsifying agents and in evaluating the emulsification efficiency of various chemical groups. A number of commercial emulsifiers have been developed, a partial list of which is included in Table 1.

TABLE 1.—TYPICAL COMMERCIAL EMULSIFIERS

| Chemical designation | Trade name | Manufacturer |
| --- | --- | --- |
| Sorbitan sesquioleate | Arlacel 83 | Atlas Chem. Ind., Inc. |
| | Arlacel C | |
| Sorbitan monolaurate | Span 20 | Atlas Chem. Ind., Inc. |
| | Arlacel 20 | Do. |
| | Armotan ML | Armour Ind. Chem. Co. |
| Sorbitan monopalmitate | Span 40 | Atlas Chem. Ind., Inc. |
| | Arlacel 40 | |
| Sorbitan monostearate | Span 60 | Atlas Chem. Inc., Inc. |
| | Arlacel 60 | Do. |
| | Armotan MS | Armour Ind. Chem. Co. |
| | Span 80 | Atlas Chem. Ind., Inc. |
| Sorbitan monooleate | Arlacel 80 | Do. |
| | Armotan MO | Armour Ind. Chem. Co. |
| Sorbitan trioleate | Span 85 | Atlas Chem. Ind., Inc. |
| | Aracel 85 | |
| Polyoxyethylene laural ether | Brij 35 | |
| | Atlas G-2133 | Atlas Chem. Ind., Inc. |
| | Atlas G-2133 | |
| | Brij 30 | |
| Polyoxyethylene monolaurate | S-307 | Glyco Prods. Co., Inc. |
| | Atlas G-2129 | Atlas Chem. Ind., Inc. |
| Polyoxyethylene alkyl aryl ether | Atlas G-1690 | |
| | Renex 648 | Atlas Chem. Ind., Inc. |
| | Renex 688 | |
| | Renex 690 | |
| Polyoxyethylene sorbitan monolaurante | Tween 20 | Atlas Chem. Ind., Inc. |
| | Tween 21 | Do. |
| | Atlas G-7596P | Do. |
| | Atlas G-7596J | Do. |
| | Armotan PML-20 | Armour Ind. Chem. Co. |
| Polyoxyethylene sorbitan monopalamate | Tween 40 | Atlas Chem. Ind., Inc. |
| Polyoxyethylene sorbitan monostearate | Tween 60 | Atlas Chem. Ind., Inc. |
| | Tween 61 | Do. |
| | Tween 65 | Do. |
| | Armotan PMS-20 | Armour Ind. Chem. Co. |
| Polyoxyethylene sorbitan monooleate | Tween 80 | Atlas Chem. Ind., Inc. |
| | Tween 81 | Do. |
| | Armotan PMO-20 | Armour Ind. Chem. Co. |
| Polyoxyethylene sorbitan trioleate | Tween 85 | Atlas Chem. Ind., Inc. |
| Polyoxyethylene sorbitan tristearate | Tween 65 | Atlas Chem. Ind., Inc. |
| | Armotan PTS-20 | Armour Chem. Ind., Inc. |

Although the products listed in Table 1 are illustrative of a number of emulsifying agents which can be employed in the practice of this invention, it is to be understood that the invention is not limited to the use of any one of the disclosed materials, and in fact in some cases emulsions satisfactory for specific purposes can be prepared without the addition of any emulsifying agent.

The foregoing commercial emulsifiers as well as other emulsifying agents, can be employed singly or as blends of two or more agents, usually of different types. The formation of stable oil in water type emulsions is generally enhanced by a mixture of oil soluble and water soluble emulsifiers. Specifically, the emulsification of various oils, and especially molten wax, in water can be enhanced by the presence of an emulsifier mixture containing both oil and water soluble agents. In this regard, a mixture of oil soluble sorbitan esters, such as for example sorbitan monolaurate, sorbitan monooleate, sorbitan monostearate, sorbitan tristearate, and the like, and water soluble polysorbate esters, such as polyoxyethylene sorbitan monolaurate, polyoxyethylene sorbitan monooleate, polyoxyethylene sorbitan monostearate, polyoxyethylene sorbitan tristearate, and the like, usually synergistically function to produce superior emulsions than are formed by equivalent quantities of a single emulsifying agent. A preferred emulsifier for the formation of finely dispersed molten wax in water is a mixture of sorbitan monostearate and polyoxyethylene sorbitan monostearate, and particularly a mixture of equal parts of these emulsifiers. This emulsifier mixture is particularly useful at concentrations of 2 to 6 weight percent of the total emulsion.

The foregoing method is further illustrated by the following more specific example of the continuous production of a dispersion of finely divided solid wax in water by first forming an emulsion of molten wax in water according to the embodiment of FIG. 1, and then cooling the emulsion to solidify the wax.

A wax feed mixture is prepared by combining 94 parts by weight of semi-refined paraffin scale wax melting at approximately 128° F. with 3 parts by weight of Armotan MS sorbitan monostearate and with 3 parts by weight of Armotan PMS-20 polyoxyethylene sorbitan monostearate, both of which are products of the Armour Industrial Chemical Company. This mixture is heated to a temperature of about 140° F. to melt the wax and gently agitated to thoroughly mix the emulsifiers into the molten wax. The wax emulsion is formed according to the embodiment of FIG. 1 by passing the molten wax-emulsifier mixture through line 9 and into mixing chamber 1 at a flow rate of approximately 60 gallons per hour. Approximately 10 gallons per hour of water at a temperature of approximately 165° F. is introduced into mixing chamber 1 via line 10. The resulting water in wax emulsion is passed from mixing chamber 1 through line 11 to mixing chamber 2 whereupon additional heated water is introduced through line 12 at a rate of 10 gallons per hour. In similar fashion, the emulsion is continuously passed through mixing chambers 3 and 4 and admixed with additional quantities of water introduced into each of chambers 3 and 4 at a rate of 10 gallons per minute. Wax in water emulsion is withdrawn from chamber 4 at a temperature within the range of 150–155° F. and passed through line 26 to cooler 23. The molten wax in water emulsion is slowly cooled to a temperature of about 100° F. by countercurrent heat exchange with 70° F. cooling water. The cooling water rate is regulated so that cooling water exiting cooler 23 is maintained at a temperature above about 125° F. Solidification of the wax results in some shrinkage, so that the final product exits cooler 23 at a rate of about 96 gallons per minute and comprises a dispersion of about 58 volume percent finely divided solid wax in about 42 percent water.

The foregoing example is illustrative of one particular mode of forming a dispersion of finely divided solid wax in water, but this example is not to be construed as limiting the scope of the invention.

Although the aforedescribed process can be conducted in several different embodiments of apparatus, some of which may be suggested by the foregoing process descriptions, a unitary apparatus for the continuous production of an emulsion of immiscible liquids according to the method of this invention is particularly preferred.

This apparatus is best described with reference to the drawings, of which,

FIG. 3 is a front elevation view showing the assembled apparatus.

FIG. 4 is an end view showing the drive end of the assembled apparatus.

FIG. 5 is an elevation view of the mixing chamber in cross-section taken along the center line of the cylindrical shell.

FIG. 6 is a transverse cross-sectional view of the mixing chamber taken along the line 6—6 of FIG. 5.

FIG. 7 is an end view of a typical mixing paddle.

FIG. 8 is a side view of a typical mixing paddle.

FIG. 9 is a detail of the sparger flange.

FIG. 10 is a detail showing an alternative sparger pipe in cross-section.

FIG. 11 is a cross-section of the sparger pipe of FIG. 10 taken along the line 11—11.

FIG. 12 is a detail showing the outboard bearing assembly in cross-section.

FIG. 13 is a detail showing the inboard bearing assembly in cross-section.

Figure 1:
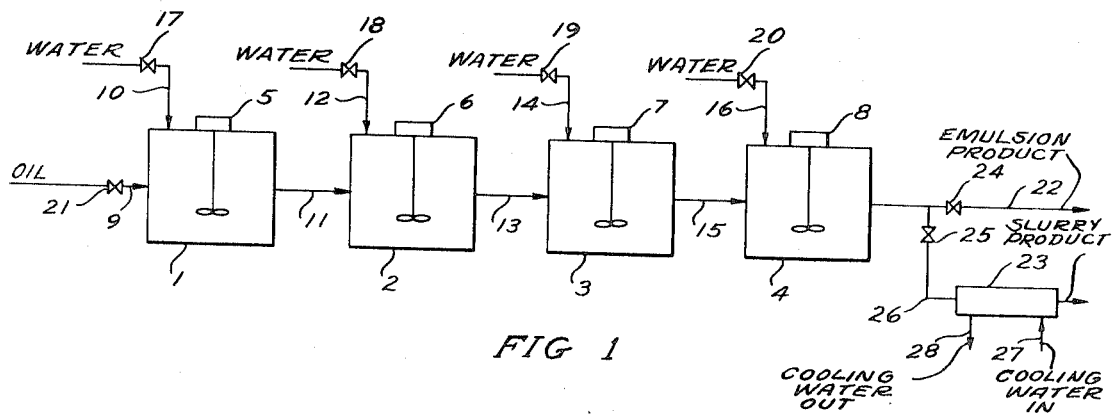
Figure 2:
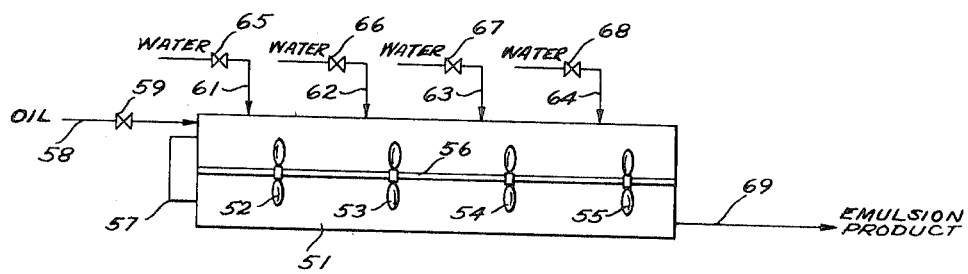

Referring now to FIGS. 3 and 4, mixing chamber 100 is shown mounted on frame 106. Frame 106 is comprised of a base formed of two parallelly disposed spaced inverted channels 107 and 108 extending the length of frame 106. Channels 107 and 108 can be drilled at convenient locations to accommodate anchor bolts, not shown. Channels 107 and 108 are maintained in spaced relationship by vertical and support members 109 and 110 fixedly attached by welding, or otherwise. Support members 109 and 110 can be plates of the shape illustrated in FIG. 4. Back cover plate 111 encloses the rear of frame 106 and comprises a flat plate extending the length and height of the frame. End support members 109 and 110 and back cover plate 111 can be integrally formed if desired. Additional support is afforded at the top of end plates 109 and 110 by longitudinal members 112 and 113 which can be formed of structural angles. Members 112 and 113 are fixedly attached to support members 109 and 110 by welding or other means. Motor mounting plate 114 is fixedly attached at the top of frame 106 as a means for mounting a drive motor which will be hereinafter more fully described.

As illustrated in FIGS. 5 and 6, mixing chamber 100 is comprised of elongated hollow cylindrical shell 101 having end flanges 102 and 103 fixedly attached at either end of the shell by welding or other means. End flanges 102 and 103 each are provided with concentric circular gasket grooves 120 and 121, respectively, adapted to receive O-ring gaskets 122 and 123. Shell 101 is closed at either end by end plates 104 and 105, adapted to fit onto end flanges 102 and 103, respectively, so as to form liquid tight closures. End flanges 102 and 103 can be fabricated from metal plate, or standard slip on raised face flanges can be employed. Similarly, end plates 104 and 105 can be fabricated from plate stock or from raised face blind flanges. Where these parts are fabricated from plate, holes must be drilled through both the end flange and the cover plate to accommodate stud bolts for removably securing the cover plates to the respective end flanges. In the case of raised face flanges, the raised faces are milled off to provide a smooth surface and the gasket grooves cut. Also, it is advisable to provide a pin, not shown, in end plates 104 and 105 adapted to fit into holes drilled into the respective end flanges to assist in proper orientation of parts on reassembly.

Mixing chamber 100 is partitioned into a series of mixing zones by internal transverse baffles 124, 125, 126, 127, 128 and 129 disposed along the length of shell 101. These baffles are supported by attachment to rod 130 which extends the length of shell 101 and is adapted to fit at one end into hole 131 drilled into cover plate 104 and at its other end into hole 132 in cover plate 105. Rod 130 serves to both support and space the transverse baffles which can be either permanently affixed thereto by welding, or removably fixed thereto by means of locking devices and set screws, not shown. The spacing between baffles can be varied to accommodate the increased volume flow rate realized by the addition of liquid along the length of shell 101, thus providing equal residence time in each mixing zone. In the case of adjustable baffles, the baffle spacing can be conveniently changed as the need arises. The baffles are cut with slightly smaller diameter than the internal diameter of shell 101 so that the entire baffle assembly can be removably fitted thereinto. As illustrated in FIG. 6, rod 130 is displaced from the center of the baffles so as not to interfere with the sparger pipe and mixer shaft which also passes therethrough. If desired a plurality of baffle support rods 130 can be employed.

Mixing is accomplished by means of paddles 140, 141, 142, 143, 144, 145 and 146 mounted on mixer shaft 147 which extends the length of shell 101. The construction of the mixing paddles is shown in FIGS. 7 and 8. Four paddle blades 150, 151, 152 and 153 are disposed 90 degrees about hub 154 and oriented axially thereto. The blades are attached to the hub by welding, or like means, and are constructed to extend beyond the hub at the inlet or suction end. The outlet or discharge end of the paddle assembly is enclosed by transverse diffuser 155, also fixedly attached to hub 154, and which has the same outside diameter as the blade assembly. Hub 154 is drilled and tapped at 156 to receive a set screw removably securing the paddle to shaft 147. If desired, hub 154 can be milled to a reduced outside diameter at the discharge end to accept diffuser 155.

Shell 101 is provided with process inlet nozzle 115 located at the top thereof adjacent end flange 103. Nozzle 115 can be a pipe nipple welded into shell 101 and adapted for the connection of process inlet line 117 which communicates with a source of feed material. The liquid material ultimately forming the enclosed phase of the emulsion is passed into mixing chamber 100 through line 117 and nozzle 115 at a rate controlled by means not shown. Temperature indicator 116 is installed in process inlet line 117 to indicate the fluid inlet temperature. Process outlet nozzle 118 is fitted into the bottom of shell 101 adjacent end flange 102. Product outlet line 119 is attached to nozzle 118 and serves to convey product emulsion to storage, to another location for use or subsequent processing, or to a cooler, not shown. Desirably, process outlet nozzle 118 is located in the bottom of shell 101, as illustrated, where the disperse phase is less dense than the continuous phase, and is located in the top of shell 101 in the reverse situation. This orientation prevents gravitation of disperse phase into the product line on shutdown, which is particularly important where the disperse phase will solidify on cooling. Nozzle 138 is provided in shell 101, also adjacent end flange 102, to accommodate thermometer 139, or other temperature detection device.

Referring again to FIGS. 5 and 6, mixer shaft 147 is rotatably supported on the outboard or inlet end of mixing chamber 100 by bearing 160 and on the inboard or discharge end by bearing 170. These bearing assemblies are mounted on end plates 104 and 105 so that the center line of shaft 147 is below and parallel with the center line of shell 101. Any conventional radial bearing capable of moderate thrust loads can be employed for both bearings 160 and 170. In the illustrated apparatus, and as shwn in FIG. 12, bearing assembly 160 is a single row ball bearing comprised of inner bearing race 162, outer bearing race 163, grease seals 164 and ball bearings 165. Bearing 160 is mounted in bearing housing 161 which is welded to the exterior of end plate 105. End plate 105 is bored to receive bearing housing 161, mixer shaft 147, and mechanical seal 180. Bearing 160 is secured in bearing housing 161 by bearing retainer ring 166 which snaps into peripheral groove 167 cut into the interior surface of bearing housing 161. The bearing is protected by cover plate 168 which press fits into bearing housing 161.

Similarly, as shown in FIG. 13, inboard bearing 170 is a single row ball bearing comprised of inner bearing race 172, outer bearing race 173, grease seals 174 and ball bearings 175. Bearings 170 is mounted in bearing housing 171 which is welded to the exterior of end plate 104. End plate 104 is bored to receive bearing housing 171, mixer shaft 147 and mechanical seal 190. Bearing 170 is secured in bearing housing 171 by bearing retainer ring 176 which snaps into peripheral groove 177 cut into the interior surface of bearing housing 171. The bearing is protected by follower 178 attached to shaft 147 by set screw 179.

Mixing shaft 147 is sealed from leakage at the points of passing through end plates 105 and 104 by mechanical seals 180 and 190, respectively. Mechanical seal 180 is located on the interior of the mixing chamber adjacent end plate 105 and mechanical seal 190 is located on the interior of the mixing chamber adjacent end plate 104. Any conventional mechanical seal or packing gland suitable for the particular operating conditions can be employed, and accordingly the details of seal construction are not illustrated. One suitable mechanical seal unit satisfactory under a wide range of operating conditions is the John Crane Type 9 seal manufactured by the Crane Packing Company. End plates 105 and 104 are bored at 181 and 191, respectively, to provide drainage from the chamber between the mechanical seal and bearing assemblies. Leakage through the respective mechanical seal units can be detected and accumulation of process liquid in the bearing can be thus prevented.

The added liquid which ultimately forms the continuous phase is distributed uniformly along the length of shell 101 by means of sparger 200. Sparger 200 comprises outer pipe 201 and inner pipe 202 and means for mounting inner pipe 202 inside of and concentric with pipe 201. Inner pipe 202 communicates with liquid supply line 203 through adapter 204 and conducts the inflowing liquid substantially the length of shell 101. Inner tube 202 has several relatively large diameter holes 205 drilled through the wall thereof so as to pass liquid from the interior of pipe 202 into the annulus between pipes 201 and 202. Typically, holes 205 will comprise three approximately 3/16-inch diameter holes located one each adjacent the inlet end of pipe 202, in the middle thereof and near the downstream end. The purpose of this construction is to distribute the inflowing fluid substantially uniformly along the length of the annulus between pipes 201 and 202. Therefore, it is desirable that the pressure drop through these holes be greater than the pressure drop of the liquid flowing through pipe 202 so as to achieve good distribution of the fluid along the sparger. Outer pipe 201 has at least one perforation or hole 206 in each of the mixing chambers, preferably located at a point adjacent the suction to the mixing paddle. Again, perforations 206 are desirably oriented upward in applications wherein the dispersed phase is less dense than the continuous phase, for the aforementioned reason, and oriented downward in the reverse situation. If desired, perforation 206 can be deleted from the first chamber so that this chamber functions only to mix the incoming liquid which will ultimately form the enclosed phase. This feature is particularly advantageous where this liquid contains an added emulsifier. Perforations 206 are typically 1/16-inch diameter holes drilled through the wall of pipe 201.

Sparger 200 is supported in shell 101 by adapter 204 and along its length by the transverse baffles. These baffles are provided with cutouts for sparger 200, of a diameter only slightly larger than the outside diameter of the pipe, so that the sparger can be readily inserted through the cutouts and rest upon the baffles without further attachment thereto. Sparger 200 is preferably positioned so that its axis is displaced from the center axis of shell 101 and so that it lies parallel and immediately above mixer shaft 147.

Adapter 204, illustrated in FIGS. 5 and 9, comprises flange 207 welded to connector 208. Connector 208 passes through a cutout in flange 207 and is welded at the outer surface to provide a liquid tight seal. Flange 207 is drilled for bolt holes at 209. Connector 208 is provided with female threads to engage liquid inlet conduit 203, and at its interior end to engage inner pipe 202. The exterior surface of connector 208 is milled to a reduced diameter at its interior end to receive outer pipe 201. Adapter 204 is mounted on end plate 105 by means of bolts, not shown. End plate 105 is drilled and tapped to receive these bolts. A liquid tight seal is provided by O ring gasket 210 fitted into groove 211 in end plate 105.

The annulus between inner pipes 202 and outer pipe 201 is closed by Sparger tube tip 212 which is threaded to engage inner pipe 202 and milled to a reduced diameter at one end to receive outer pipe 201. Thus, outer pipe 201 is held in position by a compressive force exerted by adapter 204 and tube tip 212, both of which threadably engage inner pipe 202.

An alternative sparger which achieves uniform distribution of liquid along the length of shell 101 is illustrated in FIGS. 10 and 11. This arrangement comprises pipe 220 which is of a length sufficient to extend substantially the length of shell 101 and to pass through a cutout in end plate 105. Pipe 220 is welded to end plate 105 to provide a liquid tight seal, or alternatively, a flanged connector similar to previously described adapter 204 can be employed, with the length of pipe 220 being shortened accordingly. In either case, the inlet end of pipe 220 is provided with either male or female threads to engage either the connector, or liquid conduit 203 directly, the other end of pipe 220 being sealed by plug 221. Pipe 220 is milled over a substantial portion of its length and fitted with a porous sintered metal strip 222 which is secured in place by heliarc welding, or the like. Liquid passes from the interior of pipe 220 outwardly through porous strip 222 substantially uniformly along its entire length. The length and positioning of porous strip 222 is selected to provide distribution of water substantially throughout the mixing zones. Liquid passed to pipe 220 should be well filtered to prevent plugging of porous strip 222 with solid matter.

Mixer shaft 147 is rotatably driven by drive unit 230 illustrated in FIGS. 3 and 4. Drive unit 230 comprises constant speed electric motor 231 integrally coupled to variable speed transmission 232. Output speed is adjusted over a range of 200 to 1200 r.p.m. by appropriate setting of speed adjustment 233. Normally, the paddle speed must be increased at higher throughput. Sprocket 234, mounted on the output shaft of transmission 232, drives sprocket 235, mounted on mixer shaft 147, through chain 236. Both sprockets 234 and 235 has 15 teeth so that mixer shaft 147 rotates at the same speed as the transmission output shaft, although sprockets of different sizes can be employed where speed increase or decrease is desired. Chain 236 is provided with safety guard 237 and drip oiler 238.

Shell 101 is heated by passing hot water through coil 240 which is wrapped around shell 101 substantially over its entire length. The spaces between the coil wraps is filled with conductive putty, indicated at 241, to improve the heat transfer rate between coil 240 and shell 101. Shell 101 is then covered with conventional thermal insulation 242 over its entire length.

It will be obvious to those skilled in the art that a variety of modifications of the apparatus as described can be made without departing from the spirit and scope of the invention.

The invention having been fully described, I claim:

1. An apparatus for continuously producing an emulsion of immiscible liquids, which comprises:
   an elognated shell defining an enclosed mixing chamber;
   a first liquid inlet adjacent one end of said shell for continuously introducing a first liquid into said mixing chamber;
   a liquid distributor pipe in said mixing chamber extending substantially the length of said chamber and having a plurality of small diameter apertures disposed along its length;
   an inner pipe having a smaller outside diameter than the inside diameter of said liquid distributor pipe mounted coaxially within said outer pipe so as to provide an annular flow area between the exterior of said inner pipe and the interior of said distributor pipe, said inner pipe having a plurality of relatively large diameter apertures spaced along its length to distribute the flow of liquid from the interior of said inner pipe into said annular flow area;
   a second liquid inlet communicating with the interior of said inner pipe;
   a plurality of paddles mounted on a rotatable shaft extending the length of said shell, and
   a product outlet located at the opposite end of said shell from said first liquid inlet for withdrawing an emulsion from said mixing chamber.

2. The apparatus defined in claim 1 including variable speed drive means connected to said rotatable shaft to drive said shaft at preselected speeds.

3. The aparatus defined in claim 1 including heating means on the exterior of said shell.

4. The apparatus defined in claim 1 including at least one transverse baffle disposed within said mixing chamber normal to the principal axis of said shell to divide said mixing chamber into a plurality of longitudinally arranged mixing zones, said baffles having at least one restricted opening to accommodate a flow of fluid between adajcent zones separated by said baffle.

5. The apparatus defined in claim 4 wherein the spacing between said baffles is increased along the length of said mixing chamber to afford substantially uniform residence time in each of said longitudinally disposed mixing zones.

6. The apparatus defined in claim 4 wherein each of said partitioned mixing zones has at least one of said mixing paddles disposed therein.

7. An apparatus for continuously producing an emulsion of a first liquid in a second immiscible liquid, which comprises:

an elongated, cylindrical flanged shell defining an interior mixing chamber;

end closures adapted to mate with the flanges at either end of said shell;

a first liquid inlet adjacent one end of said shell for continuously introducing a first liquid into said mixing chamber;

a liquid distributor pipe in said mixing chamber extending substantially the length of said chamber and having a plurality of small diameter apertures disposed along its length;

an inner pipe having a smaller outside diameter than the inside diameter of said liquid distributor pipe mounted coaxially within the said outer pipe so as to provide an annular flow area between the exterior of said inner pipe and the interior of said distributor pipe, said inner pipe having a plurality of rather large diameter apertures spaced along its length to distribute the flow of liquid from the interior of said inner pipe into said annular flow area;

a second liquid inlet communicating with the interior of said inner pipe;

at least one transverse baffle within said mixing chamber normal to the principal axis of said shell to divide said interior mixing chamber into a plurality of longitudinally arranged mixing zones, said baffles having at least one restricted opening to accommodate fluid flow between adjacent zones separated by said baffles;

a plurality of mixing paddles mounted on a rotatable shaft extending the length of said shell, each of said partitioned mixing zones having at least one of said paddles disposed therein;

a drive means connected to said rotatable shaft; and a product outlet located at the opposite end of said shell from said first liquid inlet for withdrawing an emulsion from said mixing chamber.

8. The apparatus defined in claim 7 wherein said drive means is a variable speed drive adapted to rotate said shaft at preselected speeds.

9. The apparatus defined in claim 7 including heating means on the exterior of said shell.

10. The apparatus defined in claim 7 wherein the spacing between said baffles is increased along the length of said mixing chamber to afford substantially uniform residence time in each of said longitudinally disposed mixing zones.

11. An apparatus for continuously producing an emulsion of a first liquid in a second immiscible liquid, which comprises:

an elongated, cylindrical flanged shell defining an interior mixing chamber;

end closures adapted to mate with the flanges at either end of said shell;

a first liquid inlet adjacent one end of said shell for continuously introducing a first liquid into said mixing chamber;

a liquid distributor pipe in said chamber extending substantially the length of said chamber and having a plurality of small diameter apertures disposed along its length;

an inner pipe having a smaller outside diameter than the inside diameter of said liquid distributor pipe mounted coaxially within said outer pipe so as to provide an annular flow area between the exterior of said inner pipe and the interior of said distributor pipe, said inner pipe having a plurality of relatively large diameter apertures spaced along its length to distribute the flow of liquid from the interior of said inner pipe into said annular flow area;

a second liquid inlet communicating with the interior of said inner pipe;

a plurality of transverse baffles within said mixing chamber normal to the principal axis of said shell to divide said interior mixing chamber into a plurality of longitudinally arranged mixing zones, said baffles having at least one restricted opening to accommodate fluid flow between adjacent zones separated by said baffles;

a plurality of mixing paddles mounted on a rotatable shaft extending the length of said shell, each of said partitioned mixing zones having at least one of said paddles disposed therein;

a variable speed drive means connected to said rotatable shaft to rotate said shaft at a preselected speed; and a product outlet located at the opposite end of said shell from said first liquid inlet for withdrawing an emulsion from said mixing chamber.

12. An apparatus for continuously producing an emulsion of immiscible liquids, which comprises:

an elongated shell defining an enclosed mixing chamber;

a first liquid inlet adjacent one end of said shell for continuously introducing a first liquid into said mixing chamber;

a second liquid inlet;

a liquid distributor pipe in said mixing chamber communicating with said second liquid inlet and extending substantially the length of said mixing chamber, said distributor pipe being at least partially formed of a porous material along a substantial portion of its length so that liquid flowing from the interior of said pipe through said porous wall is substantially uniformly distributed along the length of the mixing chamber;

mixing means within said mixing chamber to agitate the liquids passing through said mixing chamber; and a product outlet located at the opposite end of said shell from said first liquid inlet for withdrawing an emulsion from said mixing chamber.

References Cited

UNITED STATES PATENTS

| 579,318 | 3/1897 | Dame | 239—562 |
|---|---|---|---|
| 1,246,003 | 11/1917 | Headley | 259—9 |
| 1,948,871 | 2/1934 | Quehl | 259—9 |
| 2,521,398 | 9/1950 | North | 259—9X |
| 2,639,812 | 5/1953 | Guyer | 259—9X |
| 3,334,820 | 8/1967 | Flynn | 239—562X |
| 1,284,668 | 11/1918 | Haug | 209—380X |
| 1,897,156 | 2/1933 | Wells | 209—270 |
| 3,081,873 | 3/1963 | Cowen et al. | 209—273 |
| 3,247,965 | 4/1966 | Braun et al. | 209—380X |

FOREIGN PATENTS

| 1,410,107 | 7/1965 | France. |
|---|---|---|

NORMAN YUDKOFF, Primary Examiner

J. SOFER, Assistant Examiner

U.S. Cl. X.R.

259—10